United States Patent
Zhou et al.

(10) Patent No.: US 11,168,181 B2
(45) Date of Patent: Nov. 9, 2021

(54) METHOD FOR THE PREPARATION OF AN ALKOXY-FUNCTIONAL ORGANOHYDROGENSILOXANE OLIGOMER AND USE OF SAID OLIGOMER

(71) Applicant: Dow Silicones Corporation, Midland, MI (US)

(72) Inventors: Xiaoyuan Zhou, Midland, MI (US); Reza Haghpanah, Midland, MI (US); Aaron Greiner, Midland, MI (US); Eric Joffre, Midland, MI (US); Sean Reisch, Horseheads, NY (US); Christine Marchand, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/269,125

(22) PCT Filed: Sep. 2, 2020

(86) PCT No.: PCT/US2020/048969
§ 371 (c)(1),
(2) Date: Feb. 17, 2021

(87) PCT Pub. No.: WO2021/050325
PCT Pub. Date: Mar. 18, 2021

(65) Prior Publication Data
US 2021/0309807 A1 Oct. 7, 2021

Related U.S. Application Data

(60) Provisional application No. 62/898,564, filed on Sep. 11, 2019.

(51) Int. Cl.
| | |
|---|---|
| C08G 77/18 | (2006.01) |
| C08G 77/50 | (2006.01) |
| C08G 77/34 | (2006.01) |
| B01J 23/40 | (2006.01) |
| C08K 5/5415 | (2006.01) |

(52) U.S. Cl.
CPC .............. C08G 77/18 (2013.01); B01J 23/40 (2013.01); C08G 77/34 (2013.01); C08G 77/50 (2013.01); C08K 5/5415 (2013.01)

(58) Field of Classification Search
CPC ....... C08K 5/5419; C08G 77/50; C08G 77/18
See application file for complete search history.

(56) References Cited

U.S. PATENT DOCUMENTS

| | | | |
|---|---|---|---|
| 3,159,601 | A | 12/1964 | Ashby |
| 3,220,972 | A | 11/1965 | Lamoreaux |
| 3,296,291 | A | 1/1967 | Chalk et al. |
| 3,419,593 | A | 12/1968 | Willing |
| 3,516,946 | A | 6/1970 | Modic |
| 3,814,730 | A | 6/1974 | Karstedt |
| 3,989,668 | A | 11/1976 | Lee et al. |
| 4,766,176 | A | 8/1988 | Lee et al. |
| 4,784,879 | A | 11/1988 | Lee et al. |
| 5,017,654 | A | 5/1991 | Togashi et al. |
| 5,036,117 | A | 7/1991 | Chung et al. |
| 5,175,325 | A | 12/1992 | Brown et al. |
| 6,111,126 | A | 7/2000 | Tachikawa et al. |
| 6,175,031 | B1 | 1/2001 | Tachikawa |
| 6,376,635 | B1 | 4/2002 | Amako et al. |
| 9,156,948 | B2 | 10/2015 | Brandstadt et al. |
| 2008/0300358 | A1 | 12/2008 | Cook et al. |
| 2009/0270646 | A1* | 10/2009 | Ferguson ............... C07F 7/20 556/451 |
| 2009/0291238 | A1 | 11/2009 | Scott et al. |
| 2014/0024849 | A1 | 1/2014 | Standke et al. |

FOREIGN PATENT DOCUMENTS

| | | |
|---|---|---|
| EP | 0347895 | 11/1993 |
| EP | 1006118 | 7/2000 |
| GB | 1115052 | 9/1968 |
| JP | 4230291 | 8/1992 |
| JP | 09151190 | 6/1997 |
| JP | 10036377 | 2/1998 |
| JP | 2000256374 | 9/2000 |
| JP | 2003064085 | 3/2003 |
| JP | 2014224068 | 12/2014 |
| RU | 2537302 | 12/2014 |
| WO | WO 2019/005711 | * 1/2019 |

OTHER PUBLICATIONS

Search report from corresponding China 202080005290.2 application, dated Jul. 14, 2021.

* cited by examiner

Primary Examiner — Marc S Zimmer
(74) Attorney, Agent, or Firm — Catherine U. Brown

(57) ABSTRACT

A method for the preparation of an alkoxy-functional hydrogensiloxane oligomer includes reacting a polyorganohydrogensiloxane oligomer and an aliphatically unsaturated alkoxysilane in the presence of a hydrosilylation reaction and a promoter. The resulting crude reaction product is treated with a treating agent, and thereafter distilled to produce the alkoxy-functional organohydrogensiloxane oligomer. The alkoxy-functional hydrogensiloxane oligomer can be reacted with polyorganosiloxane having an aliphatically unsaturated monovalent hydrocarbon group to form a polyalkoxy-functional polyorganosiloxane. The polyalkoxy-functional polyorganosiloxane can be formulated in condensation reaction curable compositions.

15 Claims, No Drawings

METHOD FOR THE PREPARATION OF AN ALKOXY-FUNCTIONAL ORGANOHYDROGENSILOXANE OLIGOMER AND USE OF SAID OLIGOMER

CROSS-REFERENCE TO RELATED APPLICATIONS

This application is a U.S. national stage filing under 35 U.S.C. § 371 of PCT Application No. PCT/US2020/048969 filed on 2 Sep. 2020, currently pending, which claims the benefit of U.S. Provisional Patent Application Ser. No. 62/898,564 filed on 11 Sep. 2019 under 35 U.S.C. § 119 (e). PCT Application No. PCT/US2020/048969 and U.S. Provisional Patent Application Ser. No. 62/898,564 are both hereby incorporated by reference.

TECHNICAL FIELD

A method for the preparation of an alkoxy-functional hydrogensiloxane oligomer is disclosed. The alkoxy-functional hydrogensiloxane oligomer can be reacted with polyorganosiloxane having an aliphatically unsaturated monovalent hydrocarbon group to form a polyalkoxy-functional polyorganosiloxane, which is useful in condensation reaction curable compositions.

BACKGROUND

Bis(trimethoxysilylethyl)dimethylsiloxy-n-propylsilane was prepared by hydrosilylation of tris(dimethylsiloxy)-n-propylsilane and vinyltrimethoxysilane catalyzed by platinum, which led to bis(trimethoxysilylethyl)dimethylsiloxy-n-propylsilane in a yield of 40%, with the 1:1 and 1:3 adducts as the major byproducts. The beta-isomer: alpha-isomer ($\beta$:$\alpha$) ratio was 70:30.

Dimethylacetoxysilane has been proposed as a hydrosilylation reaction promoter to improve both the yield of bis(trimethoxysilylethyl)dimethylsiloxy-n-propylsilane from 40% to 75%, and the regioselectivity for beta-isomer from 70% to 88%.

However, this method suffered from the drawback that acetoxy groups were bonded to silicon atoms in the final product when preparing the polymethoxy-functional polydimethylsiloxane. The acetoxy groups can cause viscosity of the polymethoxy-functional polydimethylsiloxane to increase with time upon storage as acetic acid was released to catalyze the condensation reaction.

Problem to be Solved

There is an industry need to provide an acetoxy-free alkoxy-functional hydrogensiloxane oligomer with high yield and high selectivity to the beta-isomer.

BRIEF SUMMARY OF THE INVENTION

A method for preparing a product comprising an alkoxy-functional organohydrogensiloxane oligomer, where the method comprises:

1) reacting starting materials comprising:
   (A) a polyorganohydrogensiloxane oligomer of unit formula (I): $(HR^1_2SiO_{1/2})_e(R^1_3SiO_{1/2})_f(HR^1SiO_{2/2})_g$ $(R^1_2SiO_{2/2})_h(R^1SiO_{3/2})_i(HSiO_{3/2})_j(SiO_{4/2})_k$ where subscripts e, f, g, h, i, j, and k have values such that 5≥e≥0, 5≥f≥0, 10≥g≥0, 5≥h≥0, subscript i is 0 or 1, 5≥j≥0, subscript k is 0 or 1, with the proviso that a quantity (e+g+j)≥2, and a quantity (e+f+g+h+i+j+k)≤50; and each $R^1$ is independently selected from the group consisting of a monovalent hydrocarbon group of 1 to 18 carbon and a monovalent halogenated hydrocarbon group of 1 to 18 carbon atoms; and (B) an aliphatically unsaturated alkoxysilane of formula (II):

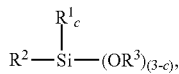

where $R^1$ is as described above, $R^2$ is an aliphatically unsaturated monovalent hydrocarbon group of 2 to 18 carbon atoms, each $R^3$ is an independently a monovalent hydrocarbon group of 1 to 18 carbon atoms, and subscript c is 0 or 1; in the presence of (C) a platinum group metal catalyst; and
   (D) a hydro(acyloxy)-functional silicon compound of formula (III):

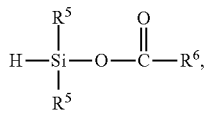

where each $R^5$ is independently a monovalent hydrocarbon group of 1 to 18 carbon atoms or a monovalent halogenated hydrocarbon group of 1 to 18 carbon atoms, and $R^6$ is a monovalent hydrocarbon group of 1 to 18 carbon atoms, thereby preparing a reaction product comprising the alkoxy-functional organohydrogensiloxane oligomer; and 2) treating the reaction product prepared in step 1) with a treating agent comprising
   (E) a sorbent selected from the group consisting of
      (E-1) an activated carbon,
      (E-2) an ion exchange resin,
      (E-3) a compound of formula $NR^8_xR^9_yR^{10}_{(3-x-y)}$, where $R^8$, $R^9$, and $R^{10}$ are each independently selected from the group consisting of a hydrogen atom and a monovalent hydrocarbon group of 1 to 18 carbon atoms, subscript x is 0 to 3, subscript y is 0 to 3, and a quantity (x+y)≤3;
      (E-4) a compound of formula

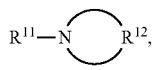

where $R^{11}$ is selected from the group consisting of a hydrogen atom and a monovalent hydrocarbon group of 1 to 18 carbon atoms, and $R^{12}$ is a divalent hydrocarbon group of 1 to 18 carbon atoms; and
      (E-5) a combination of two or more of (E-1) to (E-4); and
   (F) a compound of formula $HOR^7$, where $R^7$ is a hydrogen atom or a monovalent hydrocarbon group of 1 to 18 carbon atoms, thereby preparing the product comprising the alkoxy-functional organohydrogensiloxane oligomer; and 3) distilling the product of step 2), thereby recovering the alkoxy-functional organohydrogensiloxane oligomer.

The alkoxy-functional organohydrogensiloxane oligomer has unit formula (V):

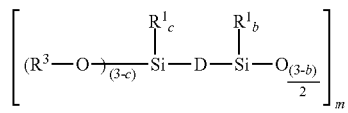

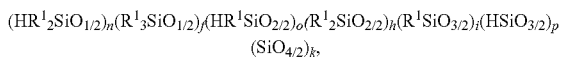

where
$R^1, R^3$, and subscripts c, f, h, i, and k are as described above, subscript b is 0 to 2, m>0, and a quantity (m+n+o+p)=(e+g+j), and each D is independently a divalent hydrocarbon group of 2 to 18 carbon atoms.

The alkoxy-functional organohydrogensiloxane oligomer is useful in a method for preparing a polyalkoxy-functional polyorganosiloxane. The method for preparing the polyalkoxy-functional polyorganosiloxane comprises:
(1) reacting starting materials comprising:
   (a) the alkoxy-functional organohydrogensiloxane oligomer prepared by the method described above,
   (b) a polyorganosiloxane having, per molecule, an average of at least one aliphatically unsaturated monovalent hydrocarbon group; and
   (c) a hydrosilylation reaction catalyst.

The polyalkoxy-functional polyorganosiloxane is useful in a method for preparing a condensation reaction curable composition. The method for preparing the condensation reaction curable composition comprises mixing starting materials comprising:
   (i) the polyalkoxy-functional polyorganosiloxane prepared by the method described above, and
   (ii) a condensation reaction catalyst.

DETAILED DESCRIPTION OF THE INVENTION

In the method described above for preparing the product comprising the alkoxy-functional organohydrogensiloxane oligomer, the following starting materials are used. Starting material (A) is a polyorganohydrogensiloxane oligomer, starting material (B) is an aliphatically unsaturated alkoxysilane, starting material (C) is a hydrosilylation reaction catalyst, starting material (D) is a hydro(acyloxy)-functional silicon compound, starting material (E) is a sorbent, and starting material (F) is a compound of formula $HOR^7$, where $R^7$ is a hydrogen atom or a monovalent hydrocarbon group.
(A) Polyorganohydrogensiloxane Oligomer Ingredient (A) useful in the method described above is a polyorganohydrogensiloxane oligomer of unit formula (I):
$(HR^1_2SiO_{1/2})_e(R^1_3SiO_{1/2})_f(HR^1SiO_{2/2})_g(R^1_2SiO_{2/2})_h$
$(R^1SiO_{3/2})_i(HSiO_{3/2})_j(SiO_{4/2})_k$ where subscripts e, f, g, h, i, j, and k have values such that 5≥e≥0, 5≥f≥0, 10≥g≥0, 5≥h≥0, subscript i is 0 or 1, 5≥j≥0, subscript k is 0 or 1, with the proviso that a quantity (e+g+j)≥2, and a quantity (e+f+g+h+i+j+k)≤50; and each $R^1$ is independently a monovalent hydrocarbon group of 1 to 18 carbon or a monovalent halogenated hydrocarbon group of 1 to 18 carbon atoms. Alternatively, monovalent hydrocarbon groups for $R^1$ have 1 to 12 carbon atoms, and alternatively 1 to 10 carbon atoms.

Suitable monovalent hydrocarbon groups for $R^1$ include, but are not limited to, an alkyl group of 1 to 6 carbon atoms and an aryl group of 6 to 10 carbon atoms. Suitable alkyl groups for $R^1$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups for $R^1$ are exemplified by, but not limited to, phenyl, tolyl, xylyl, naphthyl, benzyl, and dimethyl phenyl. Suitable monovalent halogenated hydrocarbon groups for $R^1$ include, but are not limited to, a halogenated alkyl group of 1 to 6 carbon atoms, or a halogenated aryl group of 6 to 10 carbon atoms. Suitable halogenated alkyl groups for $R^1$ are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups for $R^1$ are exemplified by, but not limited to, the aryl groups described above where one or more hydrogen atoms is replaced with a halogen atom, such as F or Cl. For example, chlorobenzyl and fluorobenzyl are suitable halogenated aryl groups. Alternatively, each $R^1$ is independently methyl, ethyl or propyl. Each instance of $R^1$ may be the same or different. Alternatively, each $R^1$ is a methyl group. Examples of suitable hydridosilanes include trimethylsilane and trimethoxysilane.

Step 1) of the method described above produces a reaction product comprising the alkoxy-functional organohydrogensiloxane oligomer. The alkoxy-functional organohydrogensiloxane oligomer has unit formula (V):

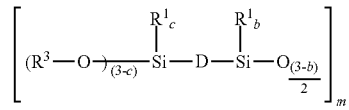

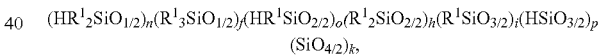

where
$R^1, R^3$, and subscripts c, f, h, i, and k are as described above, subscript b is 0 to 2, subscript m>0, and subscripts m, n, o, and p have values such that a quantity (m+n+o+p)=(e+g+j), and each D is independently a divalent hydrocarbon group of 2 to 18 carbon atoms. Subscripts e, g, and j are as described above in formula (I). The method described herein provides the benefit that this alkoxy-functional organohydrogensiloxane oligomer is produced with high selectivity to the β-adduct compounds, i.e., where each D is linear, with either none or lower amounts of the corresponding α-adduct compounds (having one or more instances of D being non-linear) than existing methods that do not include a promoter.

In an alternative embodiment, ingredient (A) is an α,γ-hydrogen terminated organohydrogensiloxane oligomer of formula (VI):

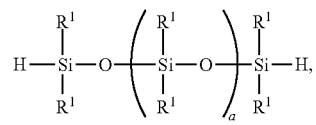

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is an integer up to 20. Alternatively, subscript a is 0 to 20, alternatively subscript a is 0 to 10; alternatively subscript a is 0 to 5; and alternatively subscript a is 0 or 1. Alternatively, subscript a may be 2 to 10; alternatively subscript a is 2 to 5. Examples of suitable organohydrogensiloxane oligomers include 1,1,3,3,5,5-hexamethyltrisiloxane, 1,1,3,3-tetramethyldisiloxane, 1,1,3,3,5,5-hexaethyltrisiloxane, and 1,1,3,3-tetraethyldisiloxane. Alternatively, ingredient (A) may be 1,1,3,3-tetramethyldisiloxane.

When the organohydrogensiloxane oligomer of formula (VI) is used in the method, the product comprises an alkoxy-functional organohydrogensiloxane oligomer produced of formula (VII):

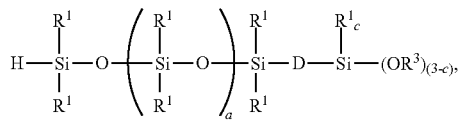

where $R^1$ and subscripts a and c are as described above, D is a divalent hydrocarbon group of 2 to 18 carbon atoms, with the proviso that >90 mol % of D are linear divalent hydrocarbon groups.

In an alternative embodiment, ingredient (A) the organohydrogensiloxane oligomer has unit formula (VIII): $(HR^1{}_2SiO_{1/2})_3(R^1{}_2SiO_{2/2})_q(R^1SiO_{3/2})$, where subscript q is 0 to 3. The polyorganohydrogensiloxane oligomer of this unit formula may have formula (IX):

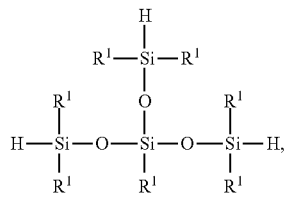

where $R^1$ is as described above. Examples of such organohydrogensiloxane oligomers include siloxanes of formula (X): $(Me_2HSiO_{1/2})_3(PrSiO_{3/2})$, where Me represents a methyl group and Pr represents a propyl group.

When the organohydrogensiloxane oligomer used for ingredient A) in the method described above has unit formula (XII), the product comprises an alkoxy-functional organohydrogensiloxane oligomer of formula (XIII) where formula (XIII) is:

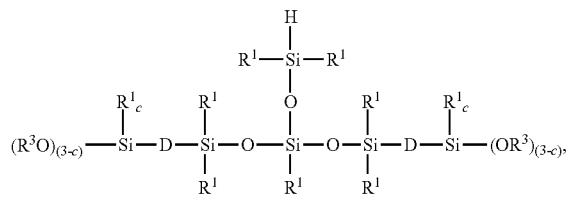

where $R^1$ and subscript c are as described above, each D is independently a divalent hydrocarbon group of 2 to 18 carbon atoms, with the proviso that >90 mol % of D are linear divalent hydrocarbon groups.

In an alternative embodiment of the invention, ingredient (A) the organohydrogensiloxane oligomer may have unit formula (XIV): $(HR^1{}_2SiO_{1/2})_2(R^1{}_2SiO_{2/2})_q(HR^1SiO_{2/2})_r$, where $R^1$ is as described above, subscript q is 0 to 3, and subscript r is 0 to 3. In this embodiment, the organohydrogensiloxane oligomer may have formula (XV):

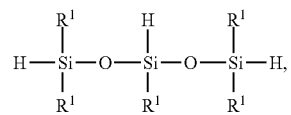

where $R^1$ is as described above. Examples of such organohydrogensiloxane oligomers include 1,1,3,5,5-pentamethyltrisiloxane. In this embodiment, the product comprises an alkoxy-functional organohydrogensiloxane oligomer of formula (XVI), formula (XVII), or a combination thereof, where formula (XVI) is

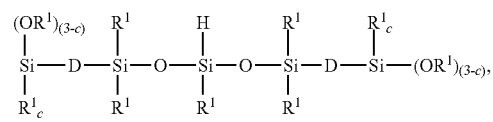

and formula (XVII) is

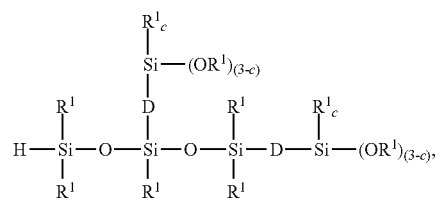

where $R^1$ and subscript c are as described above.

In an alternative embodiment ingredient (A) the organohydrogensiloxane oligomer is cyclic. The cyclic organohydrogensiloxane oligomer may have unit formula (XVIII): $(R^1{}_2SiO_{2/2})_v(R^1HSiO_{2/2})_s$, where $R^1$ is as described above, subscript s≥3, and subscript v≥0. Alternatively, subscripts may be 3 to 14; alternatively 3 to 9, alternatively 3 to 6, alternatively 3 to 5, and alternatively 4. Alternatively, subscript v may be 0 to 14; alternatively 0 to 9, alternatively 0 to 6, alternatively 0 to 5, and alternatively 0. When this cyclic organohydrogensiloxane oligomer is used as ingredient (A), then the product may comprises an alkoxy-functional organohydrogensiloxane oligomer of unit formula (XIX):
$(R^1{}_2SiO_{2/2})_v(R^1HSiO_{2/2})_t$

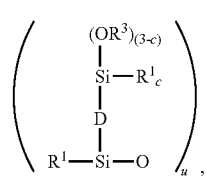

where R, $R^1$, D, and subscripts c and v are as described above, subscript t is 0 or more, subscript u is 1 or more, and a quantity (t+u)=s.

Organohydrogensiloxane oligomers and methods for their preparation are known in the art. For example, organohydrogensiloxane oligomers may be prepared, for example, by hydrolysis and condensation of organohydrosilyl chlorides.

(B) Aliphatically Unsaturated Alkoxysilane

Ingredient (B) useful in the method described above is an aliphatically unsaturated alkoxysilane of formula (II):

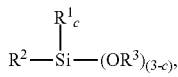

where each $R^1$ is independently a monovalent hydrocarbon group or a monovalent halogenated hydrocarbon group (as described above), each $R^2$ is independently an aliphatically unsaturated hydrocarbon group, each $R^3$ is independently a monovalent hydrocarbon group, subscript c is 0 or 1. The aliphatically unsaturated hydrocarbon group for $R^2$ may be an alkenyl group or an alkynyl group. Suitable alkenyl groups include vinyl, allyl, propenyl, butenyl and hexenyl; alternatively vinyl, allyl or hexenyl; and alternatively vinyl. The monovalent hydrocarbon group for $R^3$ may be a monovalent hydrocarbon group as described above for $R^1$.

Ingredient (B) may comprise an aliphatically unsaturated alkoxysilane exemplified by a dialkoxysilane, such as a dialkenyldialkoxysilane; a trialkoxysilane, such as an alkenyltrialkoxysilane; or a combination thereof. Examples of suitable aliphatically unsaturated alkoxysilanes include vinyltrimethoxysilane, allyltriethoxysilane, allyltrimethoxysilane, vinyltriethoxysilane, hexenyltrimethoxysilane, vinylmethyldimethoxysilane, hexenylmethyldimethoxysilane, hexenyltriethoxysilane, and a combination thereof, and alternatively vinyltrimethoxysilane. Aliphatically unsaturated silanes are known in the art and are commercially available. For example, vinyltrimethoxysilane is commercially available as XIAMETER™ OFS-6300 Silane and vinyltriethoxysilane is commercially available as XIAMETER™ OFS-6518 Silane, both from Dow Silicones Corporation of Midland, Mich., USA.

Ingredient (A) and ingredient (B) are present in relative molar amounts of ingredient (B):ingredient (A) of >1:1 to 1:1. Alternatively, (B):(A) ratio may range from 5:1 to 1:1, alternatively 2:1 to 1:1; and alternatively 1.5:1 to 1:1. Without wishing to be bound by theory, it is thought that a molar excess of ingredient (B) relative to ingredient (A) may favorably affect yield in the product.

(C) Hydrosilylation Reaction Catalyst

Ingredient (C) useful in the method and composition described herein is a hydrosilylation reaction catalyst. Hydrosilylation reaction catalysts are known in the art and are commercially available. Hydrosilylation reaction catalysts include platinum group metal catalysts. Such hydrosilylation reaction catalysts can be (C-1) a metal selected from platinum, rhodium, ruthenium, palladium, osmium, and iridium. Alternatively, the hydrosilylation reaction catalyst may be (C-2) a compound of such a metal, for example, chloridotris(triphenylphosphane)rhodium(I) (Wilkinson's Catalyst), a rhodium diphosphine chelate such as [1,2-bis (diphenylphosphino)ethane]dichlorodirhodium or [1,2-bis (diethylphospino)ethane]dichlorodirhodium, chloroplatinic acid (Speier's Catalyst), chloroplatinic acid hexahydrate, platinum dichloride. Alternatively, the hydrosilylation reaction catalyst may be (C-3) a complex of the platinum group metal compound with a low molecular weight organopolysiloxane, or (C-4) the platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). Alternatively, the hydrosilylation catalyst may comprise (C-5) the complex microencapsulated in a resin matrix. Exemplary hydrosilylation reaction catalysts are described in U.S. Pat. Nos. 3,159,601; 3,220,972; 3,296,291; 3,419, 593; 3,516,946; 3,814,730; 3,989,668; 4,784,879; 5,036, 117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Alternatively, the hydrosilylation reaction catalyst used herein may be a platinum catalyst. Platinum catalysts are commercially available, for example, SYL-OFF™ 4000 Catalyst and SYL-OFF™ 2700 are available from Dow Silicones Corporation of Midland, Mich., USA.

The amount of ingredient (C) used in step (1) of the method described above depends on various factors including the specific organohydrogensiloxane oligomer selected for ingredient (A), the specific alkoxysilane selected for ingredient (B), and the temperature to which the mixture can be heated without boiling away the organohydrogensiloxane oligomer selected for ingredient (A). However, the amount of ingredient (C) may be sufficient to provide a mass amount of platinum group metal of 1 parts per million (ppm) to 100 ppm, alternatively 5 ppm to 80 ppm, alternatively 5 ppm to 20 ppm based on combined weights of ingredients (A) and (B). The method may optionally further comprise deactivation or removal of the catalyst. However, with appropriate catalyst loading, the step of deactivation or removal of the catalyst may be omitted.

(D) Hydro(Acyloxy)-Functional Silicon Compound

Ingredient (D) useful in the method described above is a hydro(acyloxy)-functional silicon compound of formula (III):

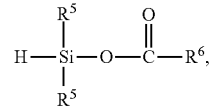

where each $R^5$ is independently a monovalent hydrocarbon group of 1 to 18 carbon atoms or a monovalent halogenated hydrocarbon group of 1 to 18 carbon atoms, and $R^6$ is a monovalent hydrocarbon group of 1 to 18 carbon atoms. Alternatively, $R^5$ may have 1 to 6 carbon atoms. Alternatively, $R^5$ may be selected from the group consisting of methyl, ethyl, n-propyl, and isopropyl. Alternatively, $R^6$ may have 1 to 6 carbon atoms. Alternatively, $R^6$ may be selected from the group consisting of methyl, ethyl, n-propyl, isopropyl, and phenyl. Exemplary hydro(acyloxy) functional silicon compounds of formula (D-1) and methods for their preparation are disclosed, for example in U.S. Pat. No. 6,175,031. Alternatively, the hydro(acyloxy)-functional silicon compound may be selected from the group consisting of dimethylacetoxysilane, diethylacetoxysilane, methylphenylacetoxysilane, methylisopropylacetoxysilane, and diphenylacetoxysilane; alternatively dimethylacetoxysilane. The amount of hydro(acyloxy)-functional silicon compound is >0 to 40 mole %, alternatively >0 to 20 mole %, based on the amount of starting material (A).

Ingredient (E) Sorbent

Ingredient (E) is a sorbent. For purposes of this application, the term "sorbent" and its derivatives, means a material capable of absorbing and/or adsorbing; alternatively adsorbing, and alternatively absorbing. Alternatively, sorbent can include a material capable of both absorbing and adsorbing. The sorbent may be selected from the group consisting of: (E-1) an activated carbon, (E-2) an ion exchange resin, (E-3) a compound of formula $NR^8_xR^9_yR^{10}_{(3-x-y)}$, where $R^8$, $R^9$, and $R^{19}$ are each independently selected from the group consisting of a hydrogen atom and a monovalent hydrocarbon group of 1 to 18 carbon atoms, subscript x is 0 to 3, subscript y is 0 to 3, and a quantity (x+y)≤3; (E-4) a compound of formula

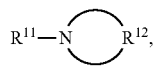

where $R^{11}$ is selected from the group consisting of a hydrogen atom and a monovalent hydrocarbon group of 1 to 18 carbon atoms, and $R^{12}$ is a divalent hydrocarbon group of 1 to 18 carbon atoms; and (E-5) a combination of two or more of (E-1) to (E-4).

Alternatively, the sorbent may be (E-1) an activated carbon. The activated carbon may be a bituminous coal based activated carbon for example, Filtrasorb™ 600 which is commercially available from Calgon Carbon Corporation of Pittsburgh, Pa., USA or a lignite based activated carbon such as, Darco™ 12×40 which is commercially available from Cabot Corporation of Boston, Mass., USA. This sorbent may be loaded at 1% to 30%, alternatively 1% to 10%, alternatively 5% to 30% and alternatively 10% to 30%, based on weight of Ingredient (A).

Alternatively, the sorbent may be (E-2) an ion exchange resin. Suitable ion exchange resins are known in the art and are commercially available. For example, the ion exchange resin may be a weak base anion exchange resin, such as AMBERLITE™ IRA-67, which is commercially available from DuPont de Nemours Inc. of Wilmington, Del., USA; and Amberlyst A21. This sorbent may be loaded at 1% to 40% based on weight of Ingredient (A).

Alternatively, the sorbent may have formula (E-3): $NR^8_xR^9_yR^{10}_{(3-x-y)}$, where $R^8$, $R^9$, and $R^{10}$ are each independently selected from the group consisting of a hydrogen atom and a monovalent hydrocarbon group of 1 to 18 carbon atoms, subscript x is 0 to 3, subscript y is 0 to 3, and a quantity (x+y)≤3. Alternatively, the absorbent may be ammonia ($NH_3$). This sorbent may be loaded at 0.5% to 50%, based on weight of Ingredient (A), alternatively 0.5% to 20% on the same basis.

Alternatively, the sorbent may have formula (E-4):

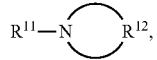

where $R^{11}$ is selected from the group consisting of a hydrogen atom and a monovalent hydrocarbon group of 1 to 18 carbon atoms, and $R^{12}$ is a divalent hydrocarbon group of 1 to 18 carbon atoms. Examples of the sorbent of formula (E-4) include piperidine, 1-methylpiperidine, pyrrolidine, 1-methylpyrrolidine. This sorbent may be loaded at 1% to 50%, based on weight of Ingredient (A).

Alternatively, the sorbent may be a combination of any two or more of (E-1), (E-2), (E-3), and (E-4).

Ingredient (F) Compound

Ingredient (F) is a compound of formula (XXII): $HOR^7$, where $R^7$ is a hydrogen atom or a monovalent hydrocarbon group of 1 to 18 carbon atoms. Alternatively, $R^7$ is a hydrogen atom or an alkyl group of 1 to 18 carbon atoms, alternatively 1 to 12 carbon atoms, and alternatively 1 to 6 carbon atoms. Alternatively, each $R^7$ is selected from the group consisting of hydrogen and methyl. The compound may be selected from the group consisting of water and methanol. The amount of Ingredient (F) may be 0.5% to 50%, alternatively 1% to 30%, based on weight of Ingredient (A).

Method Step 1)

Step 1) in the method for making the alkoxy-functional organohydrogensiloxane oligomer comprises mixing ingredients comprising ingredients (A), (B), (C), and (D), as described above. Step 1) of the method described herein may be performed at 1 atmosphere of pressure or higher. Alternatively, the method may be performed at 1 atmosphere to 1.5 atmosphere. Step 1) may be performed at 0° C. to 150° C., alternatively 50° C. to 150° C., alternatively 60° C. to 150° C., and alternatively 50° C. to 100° C. The temperature for heating in step 1) depends on various factors including the pressure selected, however, heating may be performed at least 70° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 70° C. to 150° C., alternatively 70° C. to 100° C.

The ingredients in step 1) of the method described above form a mixture, which may be homogeneous or heterogeneous. One or more additional ingredients, i.e., in addition to ingredients (A), (B), (C), and (D) described above, may optionally be used in the method. The additional ingredient, when present, may be (G) a solvent.

Ingredient (G) is a solvent that may be added to the mixture used in step 1) of the method described herein. One or more of ingredients (A), (B), (C) and/or (D) may be provided in a solvent. For example, ingredient (C) the catalyst may be dissolved in a solvent that is added to the mixture in step 1). The solvent may facilitate contacting of reactants and catalyst, flow of the mixture and/or introduction of certain ingredients, such as the catalyst. Solvents used herein are those that help fluidize the ingredients of the mixture but essentially do not react with any of these ingredients. Solvents may be selected based on solubility the ingredients in the mixture and volatility. The solubility refers to the solvent being sufficient to dissolve ingredients of the mixture. Volatility refers to vapor pressure of the solvent. If the solvent is too volatile (having too high vapor pressure) the solvent may not remain in solution during heating. However, if the solvent is not volatile enough (too low vapor pressure) the solvent may be difficult to remove from the product or isolate from the alkoxy-functional organohydrogensiloxane oligomer.

The solvent may be an organic solvent. The organic solvent can be a hydrocarbon compound such as a saturated hydrocarbon or an aromatic hydrocarbon. Suitable saturated hydrocarbons include hexane, cyclohexane, heptane, octane, and dodecane. Suitable aromatic hydrocarbons include benzene, toluene, or xylene, or a combination thereof. Ingredient (G) may be one solvent. Alternatively, ingredient (G) may comprise two or more different solvents.

The amount of solvent can depend on various factors including the specific solvent selected and the amount and type of other ingredients selected for the mixture. However, the amount of solvent may range from 0% to 99%, or when present, 1% to 99%, and alternatively 2% to 50%, based on the weight of the mixture.

Optional Step) Distilling the Reaction Product of Step 1)

The reaction product of step 1) may optionally be distilled before step 2). Distillation may be performed at 150° C. to 250° C. under reduced pressure. Pressure may be reduced to 0 to 5 mmHg, alternatively 0 to 2 mmHg. Distillation may remove all or a portion of any unreacted starting materials, and solvent, if used. However, distillation before step 2) is not required.

Alternatively, step 2) may be performed directly after step 1), i.e., without a purification step such as distillation after step 1) and before step 2).

Step 2) Treating the Product

The method for preparing the product comprising the alkoxy-functional organohydrogensiloxane oligomer further comprises: 2) treating the reaction product prepared in step 1) with a treating agent comprising (E) the sorbent, and (F) the compound of formula (XXII): $HOR^7$, where $R^7$ is a hydrogen atom or a monovalent hydrocarbon group of 1 to 18 carbon atoms. Treating may be done by any convenient means, for example, the treating agent may be added to the reaction product prepared in step 1) with mixing at RT. The reaction product of step 1) may be combined with Ingredients (E) and (F) with stirring at RT. Time for treating in step 2) may be 1 h to 24 h depending on the selection of sorbent. For example, treating may be performed for 10 h to 24 h if the sorbent is a solid at RT. Alternatively, treating may be performed for 1 h to 3 h when the sorbent is ammonia or an amine sorbents.

The method further comprises step 3): distilling the product of step 2), thereby recovering the alkoxy-functional organohydrogensiloxane oligomer. Distilling may be performed by any convenient means, e.g., with at RT or with heating and/or under vacuum, or a combination thereof. Conditions selected are sufficient to remove Ingredient (F) and any side product such as that of formula $R^6COOH$, where $R^6$ is as described above. For example, for the promoter, dimethylacetoxysilane, the conditions in step 3) were 30 mmHg at 25° C.

The (crude) reaction product of step 1) comprises the β-adduct compound alkoxy-functional organohydrogensiloxane oligomer, which is useful for functionalization of polyorganosiloxanes, including oligomers and longer chain polymers, containing aliphatically unsaturated functionality. For example, a hydrosilylation reaction of the SiH group in the alkoxy-functional organohydrogensiloxane oligomer of formula (IV) with an aliphatically unsaturated group bonded to silicon in a polyorganosiloxane (such as a polydiorganosiloxane having an aliphatically unsaturated terminal group) can produce an alkoxy-functional polyorganosiloxane. The polyorganosiloxane having an aliphatically unsaturated terminal group may have unit formula (XXIII): $(R^{17}R^{18}SiO_{1/2})_e(R^{17}R^{18}SiO_{2/2})_f(R^{17}SiO_{3/2})_g(SiO_{4/2})_h$, where each $R^{17}$ is independently a hydrogen atom, an alkyl group, an aryl group, a halogenated alkyl group, or a halogenated aryl group (such as those described above for $R^1$), and each $R^{18}$ is independently an aliphatically unsaturated hydrocarbon group such as an alkenyl group exemplified by alkenyl groups such as vinyl, allyl, butenyl, and hexenyl; and alkynyl groups such as ethynyl and propynyl. Subscript e is an integer of 0 or more, subscript f is an integer of 0 or more, subscript g is an integer of 0 or more, and subscript h is an integer of 0 or more, with the proviso that a quantity (f+g)>1. Alternatively, the polyorganosiloxane may be a polydiorganosiloxane. The polydiorganosiloxane having aliphatically unsaturated terminal groups may have formula (XXIV): $R^{17}_2R^{18}SiO(R^{17}_2SiO)_dSiR^{17}_2R^{18}$.

In formula (XVIII), $R^{17}$ and $R^{18}$ are as described above. Subscript d may be 0 or a positive number. Alternatively, each $R^{17}$ may be an alkyl group or an aryl group as described above for $R^1$. Alternatively, subscript d has an average value of at least 2. Alternatively, subscript d may have a value ranging from 2 to 2000.

The compound of formula (XXIV) may comprise a polydiorganosiloxane such as i) dimethylvinylsiloxy-terminated polydimethylsiloxane, ii) dimethylvinylsiloxy-terminated poly(dimethylsiloxane/methylphenylsiloxane), iii) dimethylvinylsiloxy-terminated poly(dimethylsiloxane/diphenylsiloxane), iv) phenyl,methyl,vinyl-siloxy-terminated polydimethylsiloxane, or v) dimethylhexenylsiloxy-terminated polydimethylsiloxane. The alkoxy-functional polyorganosiloxane may be produced by combining the product including the β-adduct compound alkoxy-functional organohydrogensiloxane oligomer with a polydiorganosiloxane of formula (XXIV) as described above.

The hydrosilylation reaction to prepare the polyalkoxy-functional polyorganosiloxane may be performed by a method comprising:

combining starting materials comprising (a) the product comprising the β-adduct compound alkoxy-functional organohydrogensiloxane oligomer as described above, (b) the polyorganosiloxane having at least one aliphatically unsaturated silicon bonded group per molecule as described above, and (c) a hydrosilylation catalyst which may be the same as, or different from, the hydrosilylation reaction catalyst used in step 1).

The polyalkoxy-functional polyorganosiloxanes produced by the hydrosilylation of described above may have formula: (XXV): $R^{17}_2R^{19}SiO(R^{17}_2SiO)_dSiR^{17}_2R^{19}$, where $R^{17}$ and subscript d are as described above, and each $R^{19}$ is polyalkoxy-functional group. In formula (XXV), >90 mol % of $R^{19}$ may be β-adduct. Alternatively, in formula (XXV), >90 mol % to 100 mol % of $R^{19}$ may be β-adduct groups. Alternatively, in formula (XXV), 92% to <100%% of $R^{19}$ may be β-adduct groups.

For example, when (b) the polyorganosiloxane having aliphatically unsaturated terminal groups is a polydiorganosiloxane of formula (XXVI):

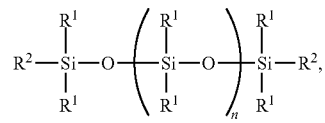

where subscript n is 1 to 2,000; the polyalkoxy-functional polyorganosiloxane may have formula (XXVII):

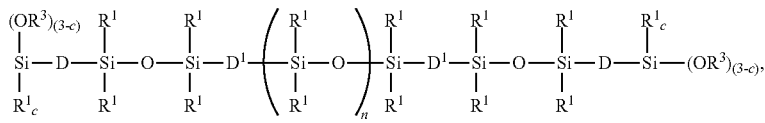

where each $D^1$ is independently a divalent hydrocarbon group; where $R^1$, $R^2$, D and subscript c are as described above.

Alternatively, the polyalkoxy-functional polyorganosiloxane may have formula (XXVIII):

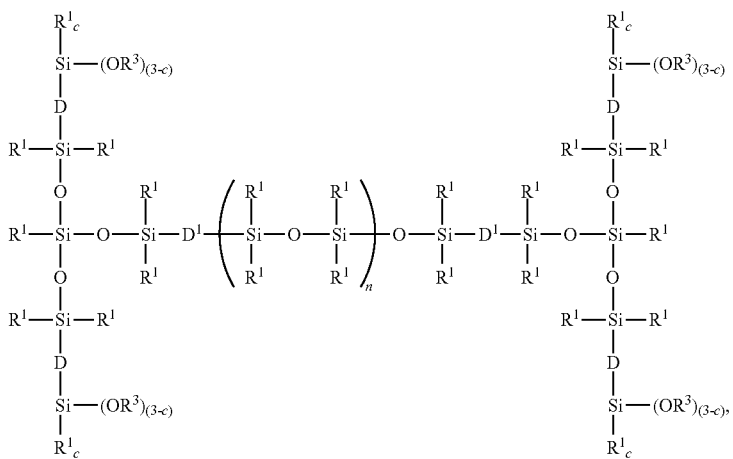

where each $D^1$ is independently a divalent hydrocarbon group; where $R^1$, $R^2$, D and subscript c are as described above.

The polyalkoxy-functional polyorganosiloxanes, such as polyalkoxy-functional polydimethylsiloxanes, prepared as described above can be used in any application that utilizes reactivity of the alkoxy groups.

For example, the polyalkoxy-functional polyorganosiloxane prepared as described above is useful in condensation reaction curable compositions, such as sealant compositions. Suitable condensation reaction curable compositions can be prepared by mixing starting materials comprising:

(i) the alkoxy-functional polyorganosiloxane prepared as described above, and (ii) condensation reaction catalyst. Without wishing to be bound by theory, it thought that a condensation reaction curable composition including (i) the polyalkoxy-functional polyorganosiloxane will cure faster than a similar condensation reaction curable composition containing a different polyalkoxy-functional polyorganosiloxane (prepared using a conventional endblocker having higher branched isomer content)

Starting material (ii) is a condensation reaction catalyst. Suitable condensation reaction catalysts include tin catalysts and titanium catalysts. Suitable tin catalysts include organotin compounds where the valence of the tin is either +4 or +2, i.e., Tin (IV) compounds or Tin (II) compounds. Examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin™ 740 and Fascat™ 4202 from Acima Specialty Chemicals of Switzerland, Europe, which is a business unit of The Dow Chemical Company. Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Exemplary titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate and bis(acetoacetonyl)-diisopropoxy titanium (IV). A titanium catalyst may be used when the composition will be formulated as a room temperature vulcanizing sealant composition. The amount of condensation reaction catalyst depends on various factors including the amount of starting material (i) and the types and amounts of any additional starting materials added to the composition, however the amount of condensation reaction catalyst may be 0.2 to 6, alternatively 0.5 to 3, parts by weight based on the weight of starting material (i).

The condensation reaction curable composition may further comprise one or more additional ingredients distinct from ingredients (i) and (ii). Suitable additional ingredients are exemplified by (iii) a filler; (iv) a filler treating agent; (v) a crosslinker; (vi) a surface modifier; (vii) a drying agent; (viii) an extender, a plasticizer, or a combination thereof; (ix) a biocide; (x) a flame retardant; (xi) a chain lengthener; (xii)

an endblocker; (xiii) a nonreactive binder; (xiv) an antiaging additive; (xv) a water release agent; (xvi) a pigment; (xvii) a rheological additive; (xviii) a vehicle (such as a solvent and/or a diluent); (xix) a tackifying agent; (xx) a corrosion inhibitor; and a combination of two or more thereof. These additional ingredients and their amounts for use in a condensation reaction curable composition are exemplified by those disclosed, for example, in U.S. Pat. No. 9,156,948.

Starting material (iii) that may be added to the composition is a filler. The filler may comprise a reinforcing filler, an extending filler, or a combination thereof. For example, the composition may optionally further comprise ingredient (iii-1), a reinforcing filler, which when present may be added in an amount ranging from 0.1% to 95%, alternatively 1% to 60%, based on the weight of the composition. The exact amount of starting material (iii-1) depends on various factors including the form of the reaction product of the composition and whether any other fillers are added. Examples of suitable reinforcing fillers include precipitated calcium carbonates and reinforcing silica fillers such as fume silica, silica aerogel, silica xerogel, and precipitated silica. Suitable precipitated calcium carbonates include Winnofil™ SPM from Solvay and Ultrapflex™ from Specialty Minerals, Inc. Fumed silicas are known in the art and commercially available; e.g., fumed silica sold under the name CAB-O-SIL™ by Cabot Corporation of Massachusetts, U.S.A.

The composition may optionally further comprise starting material (iii-2) an extending filler in an amount ranging from 0.1% to 95%, alternatively 1% to 60%, and alternatively 1% to 20%, based on the weight of the composition. Examples of extending fillers include crushed quartz, aluminium oxide, magnesium oxide, ground calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground quartz sold under the name MIN—U-SIL™ by U.S. Silica of Berkeley Springs, W. Va. Examples of extending calcium carbonates include CS-11 from Imerys, G3T from Huber, and Omyacarb 2T from Omya.

The composition may optionally further comprise starting material (iv) a treating agent. The amount of starting material (iv) can vary depending on factors such as the type of treating agent selected and the type and amount of particulates to be treated, and whether the particulates are treated before being added to the composition, or whether the particulates are treated in situ. However, starting material (iv) may be used in an amount ranging from 0.01% to 20%, alternatively 0.1% to 15%, and alternatively 0.5% to 5%, based on the weight of the composition. Particulates, such as the filler, the physical drying agent, certain flame retardants, certain pigments, and/or certain water release agents, when present, may optionally be surface treated with starting material (iv). Particulates may be treated with starting material (iv) before being added to the composition, or in situ. Starting material (iv) may comprise an alkoxysilane, an alkoxy-functional oligosiloxane, a cyclic polyorganosiloxane, a hydroxyl-functional oligosiloxane such as a dimethyl siloxane or methyl phenyl siloxane, or a fatty acid. Examples of fatty acids include stearates such as calcium stearate.

Some representative organosilicon filler treating agents that can be used as starting material (iv) include compositions normally used to treat silica fillers such as organochlorosilanes, organosiloxanes, organodisilazanes such as hexaalkyl disilazane, and organoalkoxysilanes such as $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other treating agents that can be used include alkylthiols, fatty acids, titanates, titanate coupling agents, zirconate coupling agents, and combinations thereof.

Alternatively, starting material (iv) may comprise an alkoxysilane having the formula (XXIX): $R^{13}_p Si(OR^{14})_{(4-p)}$, where subscript p may have a value ranging from 1 to 3, alternatively subscript p is 3. Each $R^{13}$ is independently a monovalent organic group, such as a monovalent hydrocarbon group of 1 to 50 carbon atoms, alternatively 8 to 30 carbon atoms, alternatively 8 to 18 carbon atoms. $R^{13}$ is exemplified by alkyl groups such as hexyl, octyl, dodecyl, tetradecyl, hexadecyl, and octadecyl; and aromatic groups such as benzyl and phenylethyl. $R^{13}$ may be saturated or unsaturated, and branched or unbranched. Alternatively, $R^{13}$ may be saturated and unbranched.

Each $R^{14}$ is independently a saturated hydrocarbon group of 1 to 4 carbon atoms, alternatively 1 to 2 carbon atoms. Starting material (iv) is exemplified by hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

Alkoxy-functional oligosiloxanes may also be used as treating agents. For example, suitable alkoxy-functional oligosiloxanes include those of the formula (XXX): $(R^{20}O)_q Si(OSiR^{21}_2 R^{22})_{(4-q)}$. In this formula, subscript q is 1, 2 or 3, alternatively subscript q is 3. Each $R^{20}$ may be an alkyl group. Each $R^{21}$ may be independently selected from a saturated or an unsaturated monovalent hydrocarbon group of 1 to 10 carbon atoms. Each $R^{22}$ may be independently selected from a saturated or an unsaturated monovalent hydrocarbon group having at least 10 carbon atoms. Suitable alkoxy-functional oligosiloxanes and methods for their preparation are disclosed, for example, in U.S. Pat. No. 6,376,635.

Alternatively, a polyorganosiloxane capable of hydrogen bonding is useful as a treating agent. This strategy to treating surface of a filler takes advantage of multiple hydrogen bonds, either clustered or dispersed or both, as the means to tether the compatibilization moiety to the filler surface. The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to a filler. The polyorganosiloxane may be incapable of forming covalent bonds with the filler. The polyorganosiloxane may be free of condensable silyl groups e.g., silicon bonded alkoxy groups, silazanes, and silanols. The polyorganosiloxane capable of hydrogen bonding may be selected from the group consisting of a saccharide-siloxane polymer, an aminofunctional polyorganosiloxane, and a combination thereof. Alternatively, the polyorganosiloxane capable of hydrogen bonding may be a saccharide-siloxane polymer.

Starting material (v) is a crosslinker. Starting material (v) may comprise a silane crosslinker having hydrolyzable groups or partial or full hydrolysis products thereof. Starting material (v) has an average, per molecule, of greater than two substituents reactive with the alkoxy groups on starting material (i). Examples of suitable silane crosslinkers for starting material (v) may have general formula (XXXI):

$R^{14}{}_k Si(R^{13})_{(4-k)}$, where each $R^{14}$ is independently a monovalent hydrocarbon group such as an alkyl group; each $R^{13}$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript k may be 0, 1, 2, or 3. For starting material (v), subscript k has an average value greater than 2. Alternatively, subscript k may have a value ranging from 3 to 4. Alternatively, each $R^{13}$ may be independently selected from hydroxyl, alkoxy, acetoxy, amide, or oxime. Alternatively, starting material (v) may be selected from an acyloxysilane, an alkoxysilane, a ketoximosilane, and an oximosilane.

Starting material (v) may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. The amount of the alkoxysilane that is used in the composition may range from 0.5 to 15, parts by weight per 100 parts by weight of starting material (i).

Starting material (v) may comprise an acyloxysilane, such as an acetoxysilane. Acetoxysilanes include a tetraacetoxysilane, an organotriacetoxysilane, a diorganodiacetoxysilane, or a combination thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenyl methyldiacetoxysilane, vinylmethyldiacetoxysilane, diphenyl diacetoxysilane, tetraacetoxysilane, and combinations thereof. Alternatively, starting material (v) may comprise organotriacetoxysilanes, for example mixtures comprising methyltriacetoxysilane and ethyltriacetoxysilane. The amount of the acetoxysilane that is used in the curable silicone composition may range from 0.5 to 15 parts by weight per 100 parts by weight of starting material (i); alternatively 3 to 10 parts by weight of acetoxysilane per 100 parts by weight of starting material (i).

Examples of silanes suitable for starting material (v) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Aminofunctional alkoxysilanes suitable for starting material (v) are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Suitable oximosilanes for starting material (v) include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Suitable ketoximosilanes for starting material (v) include methyl tris(dimethylketoximo)silane, methyl tris(methylethylketoximo)silane, methyl tris(methylpropylketoximo)silane, methyl tris(methylisobutylketoximo)silane, ethyl tris (dimethylketoximo)silane, ethyl tris(methylethylketoximo) silane, ethyl tris(methylpropylketoximo)silane, ethyl tris (methylisobutylketoximo)silane, vinyl tris (dimethylketoximo)silane, vinyl tris(methylethylketoximo) silane, vinyl tris(methylpropylketoximo)silane, vinyl tris (methylisobutylketoximo)silane, tetrakis (dimethylketoximo)silane, tetrakis(methylethylketoximo) silane, tetrakis(methylpropylketoximo)silane, tetrakis (methylisobutylketoximo)silane, methylbis (dimethylketoximo)silane, methylbis(cyclohexylketoximo) silane, triethoxy(ethylmethylketoxime)silane, diethoxydi (ethylmethylketoxime)silane, ethoxytri (ethylmethylketoxime)silane, methylvinylbis (methylisobutylketoximo)silane, or a combination thereof.

Alternatively, starting material (v) may be polymeric. For example, starting material (v) may comprise a disilane such as bis(triethoxysilyl)hexane), 1,4-bis[trimethoxysilyl(ethyl)] benzene, and bis[3-(triethoxysilyl)propyl] tetrasulfide.

Starting material (v) can be one single crosslinker or a combination comprising two or more crosslinkers that differ in at least one of the following properties: hydrolyzable substituents and other organic groups bonded to silicon, and when a polymeric crosslinker is used, siloxane units, structure, molecular weight, and sequence.

Starting material (vi) is an adhesion promoter. Suitable adhesion promoters for starting material (vi) may comprise a hydrocarbonoxysilane such as an alkoxysilane, a combination of an alkoxysilane and a hydroxy-functional polyorganosiloxane, an aminofunctional silane, a mercaptofunctional silane, or a combination thereof. Adhesion promoters are known in the art and may comprise silanes having the formula (XXXII): $R^{24}{}_t R^{25}{}_u Si(OR^{26})_{4-(t+u)}$ where each $R^{24}$ is independently a monovalent organic group having at least 3 carbon atoms; $R^{25}$ contains at least one SiC bonded substituent having an adhesion-promoting group, such as amino, epoxy, mercapto or acrylate groups; each $R^{26}$ is independently a saturated hydrocarbon group; subscript t has a value ranging from 0 to 2; subscript u is either 1 or 2; and the sum of (t+u) is not greater than 3. Saturated hydrocarbon groups for $R^{26}$ may be, for example, an alkyl group of 1 to 4 carbon atoms, alternatively 1 to 2 carbon atoms. $R^{26}$ is exemplified by methyl, ethyl, propyl, and butyl. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula (XXXIII): $R^{27}{}_v Si(OR^{28})_{(4-v)}$, where subscript v is 1, 2, or 3, alternatively subscript v is 1. Each $R^{27}$ is independently a monovalent organic group with the proviso that at least one $R^{27}$ is an unsaturated organic group or an epoxy-functional organic group. Epoxy-functional organic groups for $R^{27}$ are exemplified by 3-glycidoxypropyl and (epoxycyclohexyl)ethyl. Unsaturated organic groups for $R^{27}$ are exemplified by 3-methacryloyloxypropyl, 3-acryloyloxypropyl, and unsaturated monovalent hydrocarbon groups such as vinyl, allyl, hexenyl, undecylenyl. Each $R^{28}$ is independently a saturated hydrocarbon group of 1 to 4 carbon atoms, alternatively 1 to 2 carbon atoms. $R^{28}$ is exemplified by methyl, ethyl, propyl, and butyl.

Examples of suitable epoxy-functional alkoxysilanes include 3-glycidoxypropyltrimethoxysilane, 3-g lycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH_2)_3Si(OCH_2CH_3)_3$, $C_4H_9NH(CH_2)_2NH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl)ethylenediamine, and a combination thereof.

Alternatively, the adhesion promoter may comprise a mercaptofunctional alkoxysilane, such as 3-mercaptopropyltrimethoxysilane or 3-mercaptopropyltriethoxysilane.

The exact amount of starting material (vi) depends on various factors including the type of adhesion promoter selected and the end use of the composition and its reaction product. However, starting material (vi), when present, may be added to the composition in an amount ranging from 0.01 to 50 weight parts based on the weight of the composition, alternatively 0.01 to 10 weight parts, and alternatively 0.01 to 5 weight parts. Starting material (vi) may be one adhesion promoter. Alternatively, starting material (vi) may comprise two or more different adhesion promoters that differ in at least one of the following properties: structure, viscosity, average molecular weight, polymer units, and sequence.

When selecting ingredients for the condensation reaction curable composition described above, there may be overlap between types of starting materials because certain starting materials described herein may have more than one function. For example, certain alkoxysilanes may be useful as filler treating agents, as adhesion promoters, and as crosslinkers. Alternatively, the crosslinker, the filler, and the adhesion promoter may each be present in the composition. In this embodiment, the crosslinker may comprise an alkyl trialkoxysilane, such as methyltrimethoxysilane; the filler may comprise an extending filler such as calcium carbonate; and the adhesion promoter may comprise an alkoxysilane other than the crosslinker, such as N-(3-(trimethoxysilyl)propyl)ethylenediamine, 3-mercaptopropyltrimethoxysilane, or both The composition described above may be prepared as a one part composition, for example, by combining all ingredients by any convenient means, such as mixing. For example, a one-part composition may be made by optionally combining (e.g., premixing) (i) the alkoxy-functional polyorganosiloxane with all or part of (iii) the filler, when present; and mixing this with a pre-mix comprising the catalyst (ii) and, when present (v) the crosslinker. Other additives such as an anti-aging additive and a pigment may be added to the mixture at any desired stage. A final mixing step may be performed under substantially anhydrous conditions, and the resulting compositions are generally stored under substantially anhydrous conditions, for example in sealed containers, until ready for use.

Alternatively, the composition may be prepared as a multiple part (e.g., 2 part) composition when a crosslinker is present. In this instance the catalyst and crosslinker are stored in separate parts, and the parts are combined shortly before use of the composition. For example, a two part curable composition may be prepared by combining ingredients comprising the alkoxy-functional polyorganosiloxane and the crosslinker to form a first (curing agent) part by any convenient means such as mixing. A second (base) part may be prepared by combining starting materials comprising a catalyst and the alkoxy-functional polyorganosiloxane by any convenient means such as mixing. The starting materials may be combined at ambient or elevated temperature and under ambient or anhydrous conditions, depending on various factors including whether a one part or multiple part composition is selected. The base part and curing agent part may be combined by any convenient means, such as mixing, shortly before use. The base part and curing agent part may be combined in relative amounts of base: curing agent ranging from 1:1 to 10:1.

The equipment used for mixing the starting materials is not specifically restricted. Examples of suitable mixing equipment may be selected depending on the type and amount of each ingredient selected. For example, agitated batch kettles may be used for relatively low viscosity compositions, such as compositions that would react to form gums or gels. Alternatively, continuous compounding equipment, e.g., extruders such as twin screw extruders, may be used for more viscous compositions and compositions containing relatively high amounts of particulates. Exemplary methods that can be used to prepare the compositions described herein include those disclosed in, for example, U.S. Patent Publications US 2009/0291238 and US 2008/0300358.

These compositions made as described above may be stable when the stored in containers that protect the compositions from exposure to moisture, but these compositions may react via condensation reaction when exposed to atmospheric moisture.

Examples

These examples are intended to illustrate some embodiments of the invention and should not be interpreted as limiting the scope of the invention set forth in the claims. In the examples below, the examples for preparing alkoxy-functional organohydrogensiloxane oligomers were performed under inert conditions, i.e., the flask was purged with nitrogen before adding starting materials.

Synthesis of bis(trimethoxysilylethyl)-dimethylsiloxy-n-propylsilane (EHM)

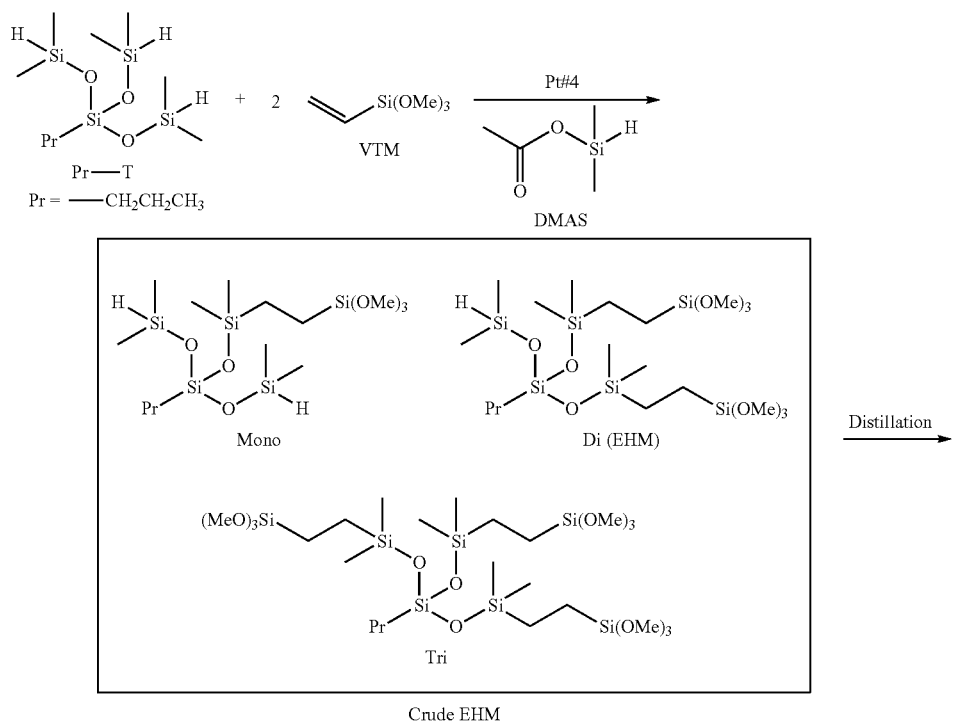

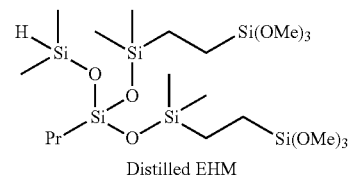

Distilled EHM

Si-acetoxy species in crude EHM

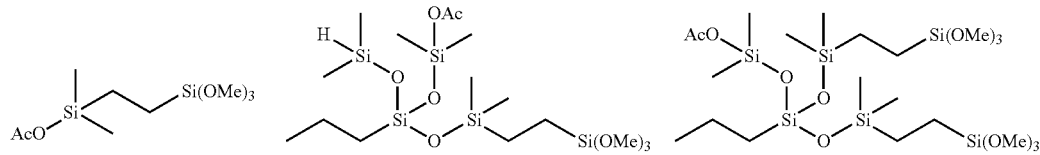

In this Reference Example 1, crude EHM was prepared as follows: tris(dimethylsiloxy)-n-propylsilane (2.51 mol), dimethylacetoxysilane (0.502 mol), and platinum catalyst (15.8 μmol Pt) were loaded into a reactor, mixed, and heated to 70° C. Vinyltrimethoxysilane (5.40 mol) was gradually added to the mixture in the reactor over 160 min to maintain liquid temperature in the reactor of 75° C. to 90° C. The resulting crude EHM was characterized by $^1$H NMR to determine the β/α ratio, acetoxy level (acetyl/propyl mole ratio), and Si—H level (Si—H/propyl mole ratio), shown in Table 1

TABLE 1

| crude EHM analysis | |
|---|---|
| β/α ratio | 89/11 |
| acetyl/propyl mole ratio | 0.19 |
| Si—H/propyl mole ratio | 0.30 |

In this Reference Example 2, the crude EHM prepared in reference example 1 was purified by distillation under 1 Torr vacuum and collected as overhead species. The distilled EHM was characterized by $^1$H NMR to determine the β/α ratio, acetoxy level (acetyl/propyl mole ratio), and Si—H level (Si—H/propyl mole ratio), shown in Table 2, below.

TABLE 2

| distilled EHM analysis | |
|---|---|
| β/α ratio | 90/10 |
| acetyl/propyl mole ratio | 0.012 |
| Si—H/propyl mole ratio | 0.31 |

In this Example 3, the crude EHM prepared in Reference Example 1 was treated with activated carbon (Filtrasorb 600) in an amount of 0.3 g and H$_2$O (0.06 g). The mixture was stirred at 25° C. for 24 h, filtered, and dried under vacuum. The acetoxy level (acetyl/propyl mole ratio) and Si—H level (Si—H/propyl mole ratio) were measured by $^1$H NMR. After treatment, acetoxy level was reduced by 96% while Si—H was decreased by 2%.

In this Example 4, the crude EHM prepared in Reference Example 1 was treated with ion exchange resin as follows: Crude EHM (5 g) was mixed with Amberlite IRA-67 (1 g). The mixture was stirred at 25° C. for 24 h and filtered. The acetoxy level (acetyl/propyl mole ratio) and Si—H level (Si—H/propyl mole ratio) were measured by $^1$H NMR. After treatment, acetoxy level was reduced by 98% while Si—H level was decreased by 1%.

In this Example 5, crude EHM prepared in Reference Example 1 was treated with aqueous ammonia as follows: Crude EHM (3 g) was mixed with ammonia solution (28-30%, 142 μL). The mixture was stirred at 25° C. for 3 h, filtered, and dried under vacuum. The acetoxy level (acetyl/propyl mole ratio) and Si—H level (Si—H/propyl mole ratio) were measured by $^1$H NMR. After treatment, acetoxy level was reduced by >99% while Si—H level was decreased by <1%.

In this Example 6, crude EHM prepared in Reference Example 1 was treated with an ammonia/methanol solution as follows: Crude EHM (3 g) was mixed with ammonia/methanol solution (7N, 0.32 mL). The mixture was stirred at 25° C. for 4 h, filtered, and dried under vacuum. The acetoxy level (acetyl/propyl mole ratio) and Si—H level (Si—H/propyl mole ratio) were measured by $^1$H NMR. After treatment, acetoxy level was reduced by >99% while Si—H level was decreased by 3%.

In this Comparative Example 7, crude EHM prepared in Reference Example 1 was treated with dried ion exchange resin (no Ingredient (F)) as follows: Crude EHM (5 g) was mixed with dried Amberlite IRA-67 (0.5 g). The mixture was stirred at 25° C. for 24 h and filtered. The acetoxy level (acetyl/propyl mole ratio) and Si—H level (Si—H/propyl mole ratio) were measured by $^1$H NMR. After treatment, acetoxy level was reduced by 71% while Si—H level was decreased by 3%.

In this Comparative Example 8, crude EHM prepared in Reference Example 1 was treated with CaCO$_3$ and H$_2$O as follows: Crude EHM (4 g) was mixed with CaCO$_3$ (0.8 g) and H$_2$O (0.08 g). The mixture was stirred at 25° C. for 72 h and filtered. The acetoxy level (acetyl/propyl mole ratio) and Si—H level (Si—H/propyl mole ratio) were measured by $^1$H NMR. After treatment, acetoxy level was reduced by 95% while Si—H level was decreased by 10%.

In this Comparative Example 9, crude EHM prepared in Reference Example 1 was treated with basic alumina and H$_2$O as follows: Crude EHM (5 g) was mixed with basic alumina (0.5 g) and H$_2$O (0.1 g). The mixture was stirred at 25° C. for 24 h, filtered, and dried under vacuum. The acetoxy level (acetyl/propyl mole ratio) and Si—H level (Si—H/propyl mole ratio) were measured by $^1$H NMR. After treatment, acetoxy level was reduced by 93% while Si—H level was decreased by 7%.

In this Comparative Example 10, crude EHM prepared in Reference Example 1 was treated with sodium methoxide as follows: Crude EHM (3 g) was mixed with NaOMe (0.15 g). The mixture was stirred at 25° C. for 48 h and filtered. The acetoxy level (acetyl/propyl mole ratio) and Si—H level (Si—H/propyl mole ratio) were measured by $^1$H NMR. After treatment, acetoxy level was reduced by >99% while Si—H level was decreased by 24%.

In this Comparative Example 11, crude EHM prepared in Reference Example 1 was treated with water as follows: Crude EHM (5 g) was mixed with H$_2$O (0.06 g). The mixture was stirred at 25° C. for 24 h. The acetoxy level (acetyl/propyl mole ratio) and Si—H level (Si—H/propyl mole ratio) were measured by $^1$H NMR. After treatment, acetoxy level was reduced by <5% while Si—H level was decreased by 91%.

TABLE 3

Summary of Treatment Results

| Examples | Type | Treatment | OAc/Pr Reduction | Si—H/Pr Reduction |
|---|---|---|---|---|
| 3 | Inventive | Activated carbon/H$_2$O | 96% | 2% |
| 4 | Inventive | Amberlite IRA-67 | 98% | 1% |
| 5 | Inventive | NH$_3$/H$_2$O | >99% | <1% |
| 6 | Inventive | NH$_3$/MeOH | >99% | 3% |
| 7 | Comparative | Dried Amberlite | 71% | 3% |
| 8 | Comparative | CaCO$_3$/H$_2$O | 95% | 10% |
| 9 | Comparative | Basic alumina/H$_2$O | 93% | 7% |
| 10 | Comparative | NaOMe | 99% | 24% |
| 11 | Comparative | H$_2$O | <5% | 91% |

In this example 12, treated EHM prepared in Example 5 was purified by distillation under 1 Torr vacuum and collected as an overhead species. The resulting distilled treated EHM was characterized by $^1$H NMR to determine the β/α ratio, acetoxy level (acetyl/propyl mole ratio), and Si—H level (Si—H/propyl mole ratio): 92/8 β/α; <0.001 Ac/Pr; 0.31 Si—H/Pr.

In this Comparative Example 13, a polymethoxy-functional polydimethylsiloxane was prepared as follows: To a Max 300 Long Speedmixer cup was added 450.00 g SILAS-TIC™ SFD-128 (bis-vinyldimethylsiloxy terminated polydimethylsiloxane with DP=800 to 1,000) available from Dow Silicones Corporation of Midland, Mich., USA and 7.28 g (80% conversion) of EHM prepared in Reference Example 2. The resulting mixture was blended on a 600.2 Vac-P Flaktek Speedmixer for 30 sec at 2000 rpm. Next, 1.73 g (2 ppm) 3-0313 INT Pt catalyst was added to the cup and mixed for 90 sec at 2000 rpm. The resulting polymethoxy-functional polydimethylsiloxane polymer was allowed to rest at room temperature to complete the capping reaction and was analyzed the next day. Viscosity was measured on an ARES constant strain rheometer using a 25 mm parallel cone and plate, and a steady rate sweep from 0.1-10 ($s^{-1}$). Viscosity Results are shown below in Table 4.

In this Example 14, to a Max 300 Long Speedmixer cup was added 450.00 g SILASTIC™ SFD-128 and 7.31 g (80% conversion) of distilled, treated EHM from Example 12. The resulting mixture was blended on a 600.2 Vac-P Flaktek Speedmixer for 30 sec at 2000 rpm. Next, 1.73 g (3 ppm) Karstedt's catalyst diluted with DOWSIL™ SFD-120, was added to the cup, and mixed for 90 sec at 2000 rpm. The resulting polymethoxy-functional polydimethylsiloxane polymer was allowed to rest at room temperature to complete the capping reaction and was analyzed the next day. Viscosity was measured on an ARES constant strain rheometer using a 25 mm parallel cone and plate, and a steady rate sweep from 0.1-10 ($s^{-1}$). Viscosity Results are shown below in Table 4.

TABLE 4

| | Initial viscosity (cP) | 3 weeks 50° C. viscosity (cP) |
|---|---|---|
| Comparative Example 13 | 69,700 | 169,800 |
| Example 14 | 75,100 | 83,800 |

Comparative Example 13 and Example 14 showed that the polymethoxy-functional polydimethylsiloxane treated according to the method described herein had better stability (show by less viscosity increase after 3 week aging at 50° C.).

INDUSTRIAL APPLICABILITY

The examples above showed that the method described herein is capable of producing an alkoxy-functional organohydrogensiloxane oligomer with good yield and selectivity and with minimized processing time and steps. Furthermore, example 14 and comparative example 13 above showed that when a polyorganosiloxane was endblocked with an alkoxy-functional organohydrogensiloxane oligomer prepared by the method described herein, the resulting endblocked polyorganosiloxane had better stability as shown by small viscosity increase as compared to a comparative polymethoxy-functional polydimethylsiloxane prepared without using step 2) of the method described herein.

INDUSTRIAL APPLICABILITY

Without wishing to be bound by theory, it is thought that one of the benefits of the method described herein is minimizing number of process steps and energy required for preparing the product comprising the alkoxy-functional organohydrogensiloxane oligomer. Therefore, the optional distillation step after step 1) and before step 2) may be eliminated.

DEFINITIONS AND USAGE OF TERMS

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

"Yield" means molar amount alkoxy-functional organohydrogensiloxane oligomer produced/molar amount alkoxy-functional organohydrogensiloxane oligomer possible based on the amount of limiting reagent (the aliphatically unsaturated alkoxysilane). "Selectivity" means the ratio of linear isomer/branched isomer of the alkoxy-functional organohydrogensiloxane (where isomers have the same molecular weight).

The abbreviations used herein have the definitions in Table 4.

TABLE 4

| Abbreviations | |
|---|---|
| Abbreviation | Definition |
| DMAS | dimethylacetoxysilane |
| EHM | bis(trimethoxysilylethyl)-dimethylsiloxy-n-propylsilane |
| h | hours |
| mm | millimeters |
| N | Normal |
| NMR | Nuclear Magnetic Resonance (provide a test method for the 1HNMR used in the examples) |
| OAc | acetoxy |
| PDMS | polydimethylsiloxane |
| rpm | revolutions per minute |
| Pr | propyl |
| Pr-T | tris(dimethylsiloxy)-n-propylsilane |
| Pr-T EHM | $PrSi(OSiMe_2CH_2CH_2Si(OMe)_3)_2(OSiMe_2H)$ including others isomers |
| rpm | revolutions per minute |
| RT | room temperature of 25° C. +/− 5° C. |
| sec | seconds |
| μL | microliters |
| Vi | vinyl |
| VTM | Vinyltrimethoxysilane, example of starting material B) |

The invention claimed is:

1. A method for preparing a product comprising an alkoxy-functional organohydrogensiloxane oligomer, where the method comprises:
   1) reacting starting materials comprising:
      (A) a polyorganohydrogensiloxane oligomer of unit formula: $(HR^1_2SiO_{1/2})_e(R^1_3SiO_{1/2})_f(HR^1SiO_{2/2})_g (R^1_2SiO_{2/2})_h(R^1SiO_{3/2})_i(HSiO_{3/2})_j(SiO_{4/2})_k$ where subscripts e, f, g, h, i, j, and k have values such that 5≥e≥0, 5≥f≥0, 10≥g≥0, 5≥h≥0, subscript i is 0 or 1, 5≥j≥0, subscript k is 0 or 1, with the proviso that a quantity (e+g+j)≥2, and a quantity (e+f+g+h+i+j+k) ≤50; and each $R^1$ is independently selected from group consisting of a monovalent hydrocarbon group of 1 to 18 carbon and a monovalent halogenated hydrocarbon group of 1 to 18 carbon atoms; and (B) an aliphatically unsaturated alkoxysilane of formula:

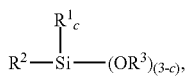

where $R^1$ is as described above, $R^2$ is an aliphatically unsaturated monovalent hydrocarbon group of 2 to 18 carbon atoms, each $R^3$ is independently a monovalent hydrocarbon group of 1 to 18 carbon atoms, and subscript c is 0 or 1;

in the presence of (C) a platinum group metal catalyst; and (D) a hydro(acyloxy)-functional silicon compound of formula:

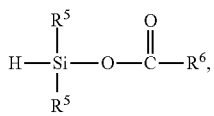

where each $R^5$ is independently a monovalent hydrocarbon group of 1 to 18 carbon atoms or a monovalent halogenated hydrocarbon group of 1 to 18 carbon atoms, and $R^6$ is a monovalent hydrocarbon group of 1 to 18 carbon atoms, thereby preparing a reaction product comprising the alkoxy-functional organohydrogensiloxane oligomer; and thereafter 2) treating the reaction product prepared in step 1) with a treating agent comprising (E) a sorbent selected from the group consisting of (E-1) an activated carbon, (E-2) an ion exchange resin, (E-3) a compound of formula $NR^8_x R^9_y R^{10}_{(3-x-y)}$, where $R^8$, $R^9$, and $R^{10}$ are each independently selected from the group consisting of a hydrogen atom and a monovalent hydrocarbon group of 1 to 18 carbon atoms, subscript x is 0 to 3, subscript y is 0 to 3, and a quantity (x+y)≤3;

(E-4) a compound of formula

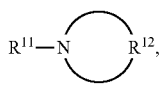

where $R^{11}$ is selected from the group consisting of a hydrogen atom and a monovalent hydrocarbon group of 1 to 18 carbon atoms, and $R^{12}$ is a divalent hydrocarbon group of 1 to 18 carbon atoms; and (E-5) a combination of two or more of (E-1) to (E-4); and (F) a compound of formula $HOR^7$, where $R^7$ is a hydrogen atom or a monovalent hydrocarbon group of 1 to 18 carbon atoms, thereby preparing the product comprising the alkoxy-functional organohydrogensiloxane oligomer; and 3) distilling the product of step 2), thereby recovering the alkoxy-functional organohydrogensiloxane oligomer.

2. The method of claim 1, where (E) the treating agent comprises ammonia ($NH_3$).

3. The method of claim 1, where (F) the compound of formula $HOR^4$ is water or methanol.

4. The method of claim 1, where the alkoxy-functional organohydrogensiloxane oligomer has unit formula:

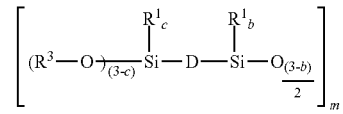

$(HR^1_2SiO_{1/2})_n(R^1_3SiO_{1/2})_f(HR^1SiO_{2/2})_o$ $(R^1_2SiO_{2/2})_h$ $(R^1SiO_{3/2})_i(HSiO_{3/2})_p(SiO_{4/2})_k$, where $R^1$, $R^3$, and subscripts c, f, h, i, and k are as described above, subscript b is 0 to 2, m>0, and a quantity (m+n+o+p)=(e+g+j), and each D is independently a divalent hydrocarbon group of 2 to 18 carbon atoms, with the proviso that >90 mol % of all D groups produced in step 1) are linear.

5. The method of claim 1, where (A) the polyorganohydrogensiloxane oligomer has formula:

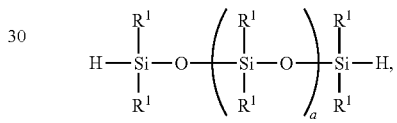

where subscript a is 0 to 10.

6. The method of claim 5, where the alkoxy-functional organohydrogensiloxane oligomer has formula:

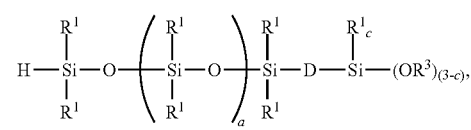

where D is a divalent hydrocarbon group of 2 to 18 carbon atoms.

7. The method of claim 1, where (A) the polyorganohydrogensiloxane oligomer has unit formula:

$(HR^1_2SiO_{1/2})_3(R^1_2SiO_{2/2})_q(R^1SiO_{3/2})$, where subscript q is 0 to 3.

8. The method of claim 7, where (A) the polyorganohydrogensiloxane oligomer has formula:

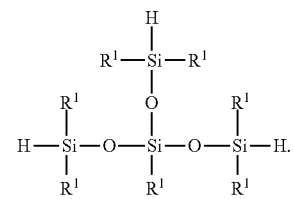

9. The method of claim 8, where alkoxy-functional organohydrogensiloxane oligomer has formulae comprising:

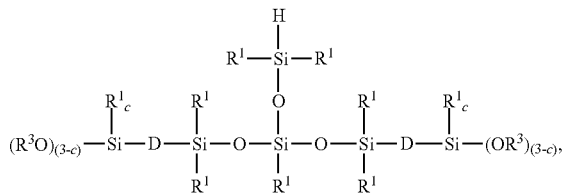

where each D is independently a divalent hydrocarbon group of 2 to 18 carbon atoms, with the proviso that >90 mol % of D are linear divalent hydrocarbon groups.

10. The method of claim 1, where the organohydrogensiloxane oligomer is a cyclic organohydrogensiloxane oligomer of unit formula: $(R^1_2SiO_{2/2})_v(R^1HSiO_{2/2})_s$, where subscript $s \geq 3$, and subscript $v \geq 0$.

11. The method of claim 10, where the alkoxy-functional organohydrogensiloxane oligomer has unit formula: $(R^1_2SiO_{2/2})_v(R^1HSiO_{2/2})$

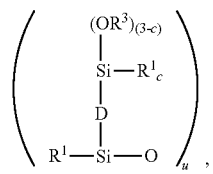

where subscript $t \geq 0$, subscript $u \geq 1$, and a quantity $(t+u)=s$.

12. The method of claim 1, where step 2) is performed directly after step 1) without a purification step after step 1) and before step 2).

13. A method for preparing a polyalkoxy-functional polyorganosiloxane, where the method comprises:
(1) preparing an alkoxy-functional organohydrogensiloxane oligomer by a method comprising
1) reacting starting materials comprising:
(A) a polyorganohydrogensiloxane oligomer of unit formula: $(HR^1_2SiO_{1/2})_e(R^1_3SiO_{1/2})_f(HR^1SiO_{2/2})_g$ $(R^1_2SiO_{2/2})_h(R^1SiO_{3/2})_i(HSiO_{3/2})_j$ $(SiO_{4/2})_k$ where subscripts e, f, g, h, i, j, and k have values such that $5 \geq e \geq 0$, $5 \geq f \geq 0$, $10 \geq g \geq 0$, $5 \geq h \geq 0$, subscript i is 0 or 1, $5 \geq j \geq 0$, subscript k is 0 or 1, with the proviso that a quantity $(e+g+j) \geq 2$, and a quantity $(e+f+g+h+i+j+k) \leq 50$; and each $R^1$ is independently selected from group consisting of a monovalent hydrocarbon group of 1 to 18 carbon and a monovalent halogenated hydrocarbon group of 1 to 18 carbon atoms; and
(B) an aliphatically unsaturated alkoxysilane of formula:

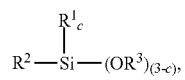

where $R^1$ is as described above, $R^2$ is an aliphatically unsaturated monovalent hydrocarbon group of 2 to 18 carbon atoms, each $R^3$ is independently a monovalent hydrocarbon group of 1 to 18 carbon atoms, and subscript c is 0 or 1;
in the presence of
(C) a platinum group metal catalyst; and
(D) a hydro(acyloxy)-functional silicon compound of formula:

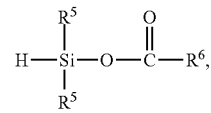

where each $R^5$ is independently a monovalent hydrocarbon group of 1 to 18 carbon atoms or a monovalent halogenated hydrocarbon group of 1 to 18 carbon atoms, and $R^6$ is a monovalent hydrocarbon group of 1 to 18 carbon atoms, thereby preparing a reaction product comprising the alkoxy-functional organohydrogensiloxane oligomer; and thereafter
2) treating the reaction product prepared in step 1) with a treating agent comprising
(E) a sorbent selected from the group consisting of
(E-1) an activated carbon,
(E-2) an ion exchange resin,
(E-3) a compound of formula $NR^8_xR^9_yR^{10}_{(3-x-y)}$, where $R^8$, $R^9$, and $R^{10}$ are each independently selected from the group consisting of a hydrogen atom and a monovalent hydrocarbon group of 1 to 18 carbon atoms, subscript x is 0 to 3, subscript y is 0 to 3, and a quantity $(x+y) \leq 3$;
(E-4) a compound of formula

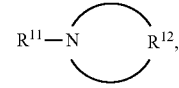

where $R^{11}$ is selected from the group consisting of a hydrogen atom and a monovalent hydrocarbon group of 1 to 18 carbon atoms, and $R^{12}$ is a divalent hydrocarbon group of 1 to 18 carbon atoms; and
(E-5) a combination of two or more of (E-1) to (E-4); and
(F) a compound of formula $HOR^7$, where $R^7$ is a hydrogen atom or a monovalent hydrocarbon group of 1 to 18 carbon atoms, thereby preparing the product comprising the alkoxy-functional organohydrogensiloxane oligomer; and
3) distilling the product of step 2), thereby recovering the alkoxy-functional organohydrogensiloxane oligomer; and thereafter
reacting starting materials comprising:
(a) the alkoxy-functional organohydrogensiloxane oligomer;
(b) a polyorganosiloxane having, per molecule, an average of at least two aliphatically unsaturated monovalent hydrocarbon groups; and
(c) a hydrosilylation reaction catalyst.

14. The method of claim 13, where starting material (b) is a polydiorganosiloxane of formula:

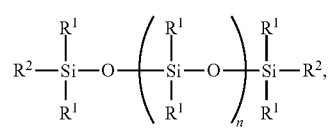

where subscript n is 1 to 2,000.

15. The method of claim 13, where the polyalkoxy-functional polyorganosiloxane has formula:
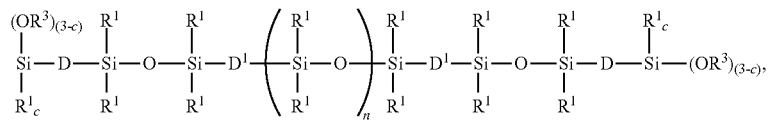
10
where each $D^1$ is independently a divalent hydrocarbon group.
* * * * *